US012421800B2

(12) United States Patent
Batarseh

(10) Patent No.: US 12,421,800 B2
(45) Date of Patent: Sep. 23, 2025

(54) DOWNHOLE LASER BORING AND PERFORATING TOOL AND METHOD OF USING SAME

(71) Applicant: SAUDI ARABIAN OIL COMPANY, Dhahran (SA)

(72) Inventor: Sameeh Issa Batarseh, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/438,262

(22) Filed: Feb. 9, 2024

(65) Prior Publication Data
US 2025/0257613 A1 Aug. 14, 2025

(51) Int. Cl.
*E21B 7/15* (2006.01)
*B23K 26/06* (2014.01)
(Continued)

(52) U.S. Cl.
CPC ............ *E21B 7/15* (2013.01); *B23K 26/0643* (2013.01); *B23K 26/0648* (2013.01);
(Continued)

(58) Field of Classification Search
CPC ........ E21B 7/15; E21B 41/0078; E21B 43/11; B23K 26/0643; B23K 26/0648; B23K 26/123; B23K 26/382
See application file for complete search history.

(56) References Cited

U.S. PATENT DOCUMENTS

| 4,282,940 A | 8/1981 | Salisbury et al. |
| 6,755,262 B2 | 6/2004 | Parker |
| (Continued) | | |

FOREIGN PATENT DOCUMENTS

| CN | 203081295 U | 7/2013 |
| CN | 203334954 U | 12/2013 |
| WO | 2014149114 A2 | 9/2014 |

OTHER PUBLICATIONS

Batarseh, Sameeh, San Roman Alerigi, Damian, Reece, John, and Haitham Othman. "Downhole High-Power Laser Tools Development and Evolutions." Paper presented at the Abu Dhabi International Petroleum Exhibition & Conference, Abu Dhabi, UAE, Nov. 2018.
(Continued)

*Primary Examiner* — Matthew R Buck
(74) *Attorney, Agent, or Firm* — Vorys, Sater, Seymour and Pease LLP

(57) ABSTRACT

A system includes a laser generating source, a downhole assembly, and a plurality of optical pathways extending between the laser generating source and the downhole assembly. The downhole assembly includes a tool housing, a plurality of reflectors, a plurality of reshaping lenses, and a main beam optical assembly. The reflectors are each movable between an activated position and a deactivated position, and are arranged to reflect energy beams radially outward away from the tool housing when in the activated position. The reshaping lenses are arranged to receive and redirect the energy beams when the reflectors are in the deactivated position. The main beam optical assembly is operable to combine the energy beams received from the reshaping lenses into a combined energy beam that is axially directed when the reflectors are in the deactivated position.

20 Claims, 5 Drawing Sheets

(51) Int. Cl.
  *B23K 26/064* (2014.01)
  *B23K 26/12* (2014.01)
  *B23K 26/382* (2014.01)
  *B23K 103/00* (2006.01)

(52) U.S. Cl.
  CPC .......... *B23K 26/123* (2013.01); *B23K 26/382* (2015.10); *B23K 2103/50* (2018.08)

(56) References Cited

U.S. PATENT DOCUMENTS

| | | | | |
|---|---|---|---|---|
| 6,851,488 | B2* | 2/2005 | Batarseh | E21B 7/14 |
| | | | | 175/11 |
| 6,888,097 | B2* | 5/2005 | Batarseh | B23K 26/064 |
| | | | | 175/11 |
| 9,217,291 | B2 | 12/2015 | Batarseh | |
| 9,534,447 | B2 | 1/2017 | Zediker et al. | |
| 9,903,171 | B2* | 2/2018 | Linetskiy | E21B 43/11 |
| 10,322,994 | B2 | 6/2019 | Allen et al. | |
| 11,142,956 | B2* | 10/2021 | Batarseh | E21B 7/06 |
| 11,739,616 | B1 | 8/2023 | Batarseh | |
| 2004/0206505 | A1* | 10/2004 | Batarseh | E21B 43/24 |
| | | | | 166/302 |
| 2004/0256103 | A1 | 12/2004 | Batarseh | |
| 2008/0194795 | A1 | 8/2008 | Hurd et al. | |
| 2011/0136704 | A1 | 6/2011 | Sharma et al. | |
| 2014/0345861 | A1 | 11/2014 | Stalder et al. | |
| 2015/0198022 | A1 | 7/2015 | Stanecki et al. | |
| 2016/0024003 | A1 | 1/2016 | Allen et al. | |
| 2016/0032218 | A1 | 2/2016 | Allen et al. | |
| 2020/0408042 | A1* | 12/2020 | Faircloth | E21B 7/15 |
| 2023/0151707 | A1 | 5/2023 | Batarseh | |

OTHER PUBLICATIONS

Batarseh, Sameeh I., Mutairi, Saad M., SanRoman, Damian P., and Abdullah M. Al Harith. "The Efficiency of High Power Laser Perforation in Shale Formations." Paper presented at the Adipec, Abu Dhabi, UAE, Oct. 2022.

Batarseh, Sameeh I., Mutairi, Saad M., SanRoman, Damian P., and Wisam J. Assiri. "First Industrial High Power Laser Field Deployment: Lab to Field." Paper presented at the ADIPEC, Abu Dhabi, UAE, Oct. 2022.

Lehr, Doug. "Technology Focus: Completions (Sep. 2018)." J Pet Technol 70 (2018): 90.

PCT International Search Report & Written Opinion pertaining to International Application No. PCT/US2025/015628; Date of Mailing: May 19, 2025.

PCT International Search Report & Written Opinion pertaining to International Application No. PCT/US2025/027444; Date of Mailing: Jul. 18, 2025.

* cited by examiner

DOWNHOLE LASER BORING AND PERFORATING TOOL AND METHOD OF USING SAME

FIELD OF THE DISCLOSURE

The present disclosure relates generally to downhole well perforation and boring and, more particularly, to downhole tooling for conventional and non-conventional reservoirs utilizing laser technology.

BACKGROUND OF THE DISCLOSURE

Wellbores may be stimulated to enhance the flow of hydrocarbons from a subterranean formation to the wellbore. To produce hydrocarbons from the targeted formation, the hydrocarbons in the formation need to flow from the formation to the wellbore in order to be produced and flow to the surface, and formation permeability facilitates the flow from the formation to the wellbore. When formation permeability is low, the wellbore may be stimulated to enhance flow, wherein such stimulation may be applied around the wellbore and into the formation in order to build a network of tunnels in the formation through which the hydrocarbons may flow.

Part of the stimulation process entails perforating casing and cement that lines the wellbore in order to reach the surrounding formation, such that the ensuing hydraulic fracturing operation will reach deeper into the formation and enhance production therefrom. Various types of tooling exists to perform such perforating operations, including tooling that utilizes laser technology. Such existing laser tooling, however, is ineffective at delivering high power laser energy at depth. In particular, it incurs significant energy loss when utilized at depth, for example, energy loss can reached up to 60% of power loss when transmitted 10,000 feet; and, when delivering high energy, for example, 20 kilo-Watts ("kW"), the loss of energy manifests in significant heat generations that can damage the transmission equipment.

A need, therefore, exists for improved tooling that is able to effectively deliver high power laser energy at depth.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system includes a laser generating source, first and second optical pathways operatively connected to the laser generating source for receiving first and second energy beams, respectively, and a downhole assembly in communication with the laser generating source via the first and second optical pathways. The downhole assembly includes a tool housing extending along a tool axis and having opposing downhole and uphole ends, the first and second optical pathways being operable to direct the first and second energy beams to the tool housing, respectively, a first reflector and a second reflector each movable between an activated position and a deactivated position, the first and second reflectors being arranged to reflect the first and second energy beams, respectively, radially outward and away from the tool axis when in the activated position, a first reshaping lens and a second reshaping lens each arranged within the interior space, the first and second reshaping lenses being arranged to receive and redirect the first and second energy beams, respectively, when the first and second reflectors are in the deactivated position, and a main beam optical assembly operable to combine the first and second energy beams received from the first and second reshaping lenses into a combined energy beam that is directed along the tool axis when the first and second reflectors are in the deactivated position.

In another embodiment, a system includes a laser generating source and a downhole assembly. The downhole assembly includes a tool housing extending along a tool axis and having opposing downhole and uphole ends, the tool housing defining an interior space that extends between the downhole and uphole ends. The downhole assembly also includes first and second optical pathways extending between the laser generating source and the tool housing, the first and second optical pathways each having an input end in optical communication with the laser generating source and an output end from which energy is discharged, the first and second optical pathways each configured to conduct energy between the input and output ends. The downhole assembly includes first and second reflectors arranged within the interior space and each being movable between an activated position and a deactivated position, the first reflector being aligned with the output end of the first optical pathway to receive energy discharged therefrom when in the activated position, and the second reflector being aligned with the output end of the second optical pathway to receive energy discharged therefrom when in the activated position. The downhole assembly includes first and second reshaping lenses arranged within the interior space, the first reshaping lens being aligned with the output end of the first optical pathway to receive energy discharged therefrom when the first reflector is in the deactivated position, and the second reshaping lens being aligned with the output end of the second optical pathway to receive energy discharged therefrom when the second reflector is in the deactivated position. The downhole assembly includes a main beam optical assembly at least partially arranged in the interior space and operable to combine energy received from the first and second reshaping lenses, wherein, when in the activated positions, the first and second reflectors redirect energy received from the output ends of the first and second optical pathways, respectfully, radially outward and away from the tool axis, and wherein, when the first and second reflectors are in the deactivated position, the main beam optical assembly combines energy received from the first and second reshaping lenses, and directs combined energy axially along the tool axis.

In a further embodiment, a method includes conveying a downhole assembly into a wellbore on coiled tubing, the coiled tubing having first and second optical pathways extending therein between the downhole assembly and a laser generating source, the downhole assembly having a tool housing that extends along a tool axis, transmitting first and second energy beams to the downhole assembly via the first and second optical pathways, respectively, arranging first and second reflectors within the downhole assembly in an activated position and thereby reflecting the first and second energy beams radially outward and away from the tool axis, arranging the first and second reflectors within the downhole assembly in a deactivated position and thereby conveying the first and second energy beams to first and second reshaping lenses, respectively, and with a main beam optical assembly included in the downhole assembly, combining the first and second energy beams received from the first and second reshaping lenses into a combined energy beam, and directing the combined energy beam out of the tool housing along the tool axis.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
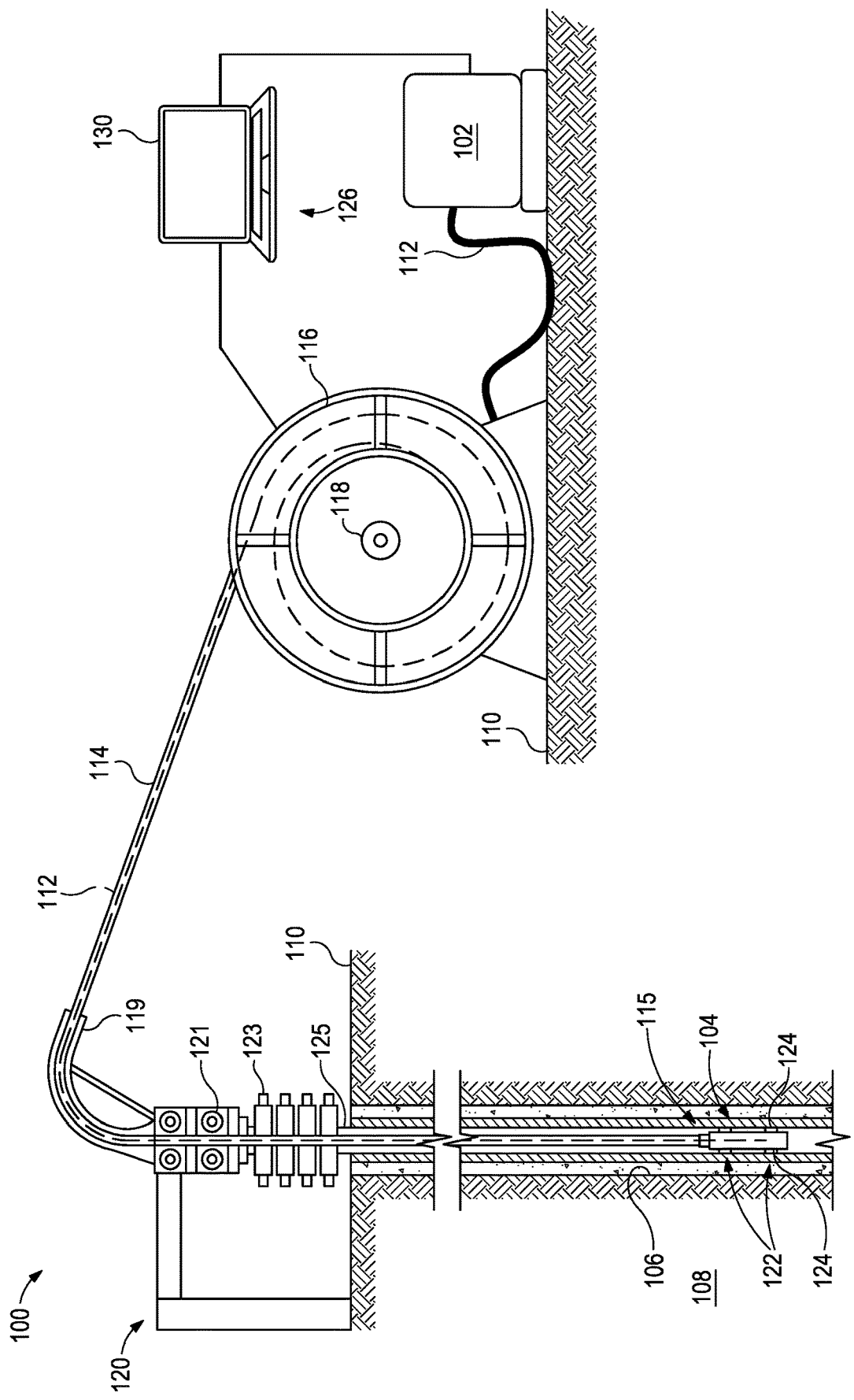
FIG. 1 is schematic of a laser boring and perforating system, according to one or more embodiments of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a downhole well perforation and boring system utilizing laser technology. The downhole well perforation and boring system includes a downhole assembly operable to discharge a plurality of radially-directed laser beams or an individual axially-directed laser beam that is relatively higher power laser than as compared to the individual radially-directed laser beams. Each radially-directed laser beam is delivered to the downhole assembly via an individual fiber optic cable and is of relatively low power, such that there will be less energy loss in cases where the fiber optic cable is of substantial length (e.g., when utilized in a downhole operation). The downhole assembly includes a plurality of reflectors that are each operable to redirect energy received from the fiber optics radially outward; and, while the radially directed laser beams are of relatively lower power, they are still operable for perforating the sidewalls of the wellbore and casing. However, the downhole assembly is still able to discharge a high power laser by directing the energy from each of the fiber optic cables, past the reflectors, to a plurality of reshaping lenses that in turn direct the energy to a main beam optical assembly, which combines the energy into the individual axially-directed laser beam that is a relatively higher power laser.

FIG. 1 is a schematic depiction of an example laser boring and perforating system 100, according to one or more embodiments of the present disclosure. The laser boring and perforating system 100 (hereinafter "the system 100") includes a laser generating source 102 and a downhole assembly 104. The downhole assembly 104 (hereinafter "the assembly 104") is a downhole tool configured to be deployed into a wellbore 106 formed in the earth 108. In the illustrated example, the laser generating source 102 is provided on a surface 110 of the earth 108 into which the wellbore 106 is drilled. The surface 110 may alternately be referred to as a "well surface".

The laser generating source 102 includes an electrical power source and a laser generator operatively coupled to the electrical power source. The electrical power source may supply relatively low power to the laser, rather than high power, as the laser generating source 102 will be transmitting separate lasers to the assembly 104, as described below. While the electrical power source may be capable of providing various levels or calibrations, in embodiments, a power range of about 2 kilo Watts (kW) to 10 kW is utilized.

The system 100 includes a plurality of optical pathways 112 extending between the laser generating source 102 and the assembly 104. Stated differently, the laser generating source 102 and the assembly 104 are operatively coupled via the plurality of optical pathways 112 such that electromagnetic radiation generated at the laser generating source 102 can be conveyed to the assembly 104 via the optical pathways 112. In embodiments, each of the optical pathways 112 is a fiber optic cable. The laser generating source 102 is operable to generate a plurality of separate laser beams, and each of the separate laser beams is transmitted to the tool via one of the plurality of optical pathways 112. The separate laser beams sent by the laser generating source 102 to each of the plurality of optical pathways 112 will be of relatively lower power, resulting in less power loss than if a relatively higher power laser was transmitted through each of the plurality of optical pathways 112. Moreover, each of the individual lasers of relatively low power may be combined into a main laser beam of relatively higher power without exhibiting the aforementioned power loss, as described below.

In embodiments, the system 100 may include coiled tubing 114 to protect the plurality of optical pathways 112 and provide a means of raising and lowering the assembly 104 within the wellbore 106. The optical pathways 112 may be arranged concentrically within the coiled tubing 114. The coiled tubing 114 may be provided and stored on a rotatable spool 116, and unwound therefrom when lowering the assembly 104 into the wellbore 106 or wound thereon when raising the assembly 104. The rotatable spool 116 of the coiled tubing 114 is rotated to advance and retract the coiled tubing 114. The coiled tubing 114 comprises a continuous length of flexible pipe capable of being wound onto and unwound from the rotatable spool 116. In some applications, as illustrated, the rotatable spool 116 may be arranged directly on the well surface 110, but could alternatively be mounted to a transport vehicle (e.g., a truck), a production rig (e.g., such as an offshore platform or the like), or may otherwise be skid-mounted.

The system 100 may include a drive assembly 118 configured to assist in controlling lowering or raising of the assembly 104 and advancing or retracting the coiled tubing 114. In embodiments, the drive assembly 118 is operably connected to the rotatable spool 116 to control rotation of the spool and thereby wind or unwind the coiled tubing 114 from the rotatable spool 116. In some embodiments, the drive assembly 118 may comprise a motor operably connected to the rotatable spool 116 and arranged to rotate the rotatable spool 116. In the illustrated embodiment, rotation of the rotatable spool 116 may be controlled by the drive assembly 118 which is mounted on the rotatable spool 116, such as a hydraulic motor or a chain-and-sprocket drive assembly.

In addition, the system 100 may include a support structure 120. The support structure 120 may include various structures and/or mechanisms, such as a derrick, crane, mast, tripod, or other similar type of structure. In embodiments, an injector 121 is operably connected to the support structure 120 to control advancement and retraction of the coiled tubing 114. In the illustrated embodiment, the coiled tubing 114 is guided from the rotatable spool 116 to the injector 121 via a tubing guide arch 119, alternately referred to as a "gooseneck." The tubing guide arch 119 supports the coiled tubing 114 through a bending radius and guides the coiled tubing 114 into the injector 121, alternately referred to as an "injector head". The injector 121 is designed to grip the outer diameter of the coiled tubing 114 and provide the force required to convey the coiled tubing 114 into the wellbore 106 and subsequently retrieve the coiled tubing 114. The injector 121 is designed to support the full weight of the coiled tubing 114, and allows an operator to control the rate of lowering the coiled tubing 114 into the wellbore 106.

The system 102 may further include a well control stack 123 operatively coupled to the injector 121 and interposing the injector 121 and a wellhead 125. The wellhead 125 constitutes the surface termination of the wellbore 106, and the wellbore 106 extends therefrom. The well control stack 123 can include a stripper assembly that provides the necessary pressure control and lubrication for the coiled tubing 114 as the coiled tubing 114 is conveyed into or retrieved from the wellbore 106. The well control stack 123 can also include a blowout preventer or "BOP", which includes a plurality of hydraulically-operated rams used to mechanically seal off the wellbore 106 at the surface 110 if well control is lost.

The plurality of optical pathways 112 extend from the laser generating source 102 and into the coiled tubing 114. The distal (downhole) end of the coiled tubing 114 is connected to the assembly 104, and an uphole end (obscured from view) is connected to the rotatable spool 116. At the uphole end of the coiled tubing 114, the plurality of optical pathways 112 enter the coiled tubing 114 from the laser generating source 102.

In some embodiments, the assembly 104 may include a centering assembly 122 operable to center the assembly 104 within the wellbore 106. In the illustrated embodiment, the centering assembly 122 includes a plurality of stabilizing plates 124, which are adjustable to center the assembly 104 in wellbores 106 of differing diameters. In embodiments, the stabilizing plates 124 are hydraulically activatable. In other embodiments, the stabilizing plates 124 are movable and adjustable via an electric motor. In even other embodiments, the stabilizing plates 124 are adjustable but without any type of motor, but are instead manually adjusted at the surface 110 to center the assembly 104 within the wellbore 106 of a particular diameter. The stabilizing plates 124 may be radially extended from the assembly 104 until they contact walls of the wellbore 106 to thereby center or otherwise position the assembly 104 in a desired position within the wellbore 106 (e.g., within the center of the wellbore 106).

In the embodiment illustrated in FIG. 1, the system 100 further includes a master controller 126. The master controller 126 is operably connected to the assembly 104, the laser generating source 102, the centering assembly 122, the drive assembly 118, and/or the injector 121. Accordingly, the master controller 126 is operable to control the various components and sub-systems of the system 100. For example, the operator may utilize the master controller 126 to activate or deactivate the centering assembly 122 and thereby center the assembly 104 within the wellbore 106. Similarly, the operator may utilize the master controller 126 to turn on the laser generating source 102 and/or to raise or lower the assembly 104.

As illustrated, the control system 126 may include a computer or computer unit 130 having a display or graphical user interface that allows an operator to manage operation of the assembly 104, the laser generating source 102, the centering assembly 122, the drive assembly 118, and/or the injector 121. The computer 130 may also display data and information obtained from the assembly 104 during operation. The computer 130 may have a processor and a computer readable medium on which programmable instructions may be stored. The computer readable medium can include a nonvolatile or non-transitory memory with data and instructions that are accessible to the processor and executable thereby. The computer readable medium may also be pre-programmed or selectively programmable with instructions for operating the assembly 104 or any of the method steps described herein.

Figure 2:
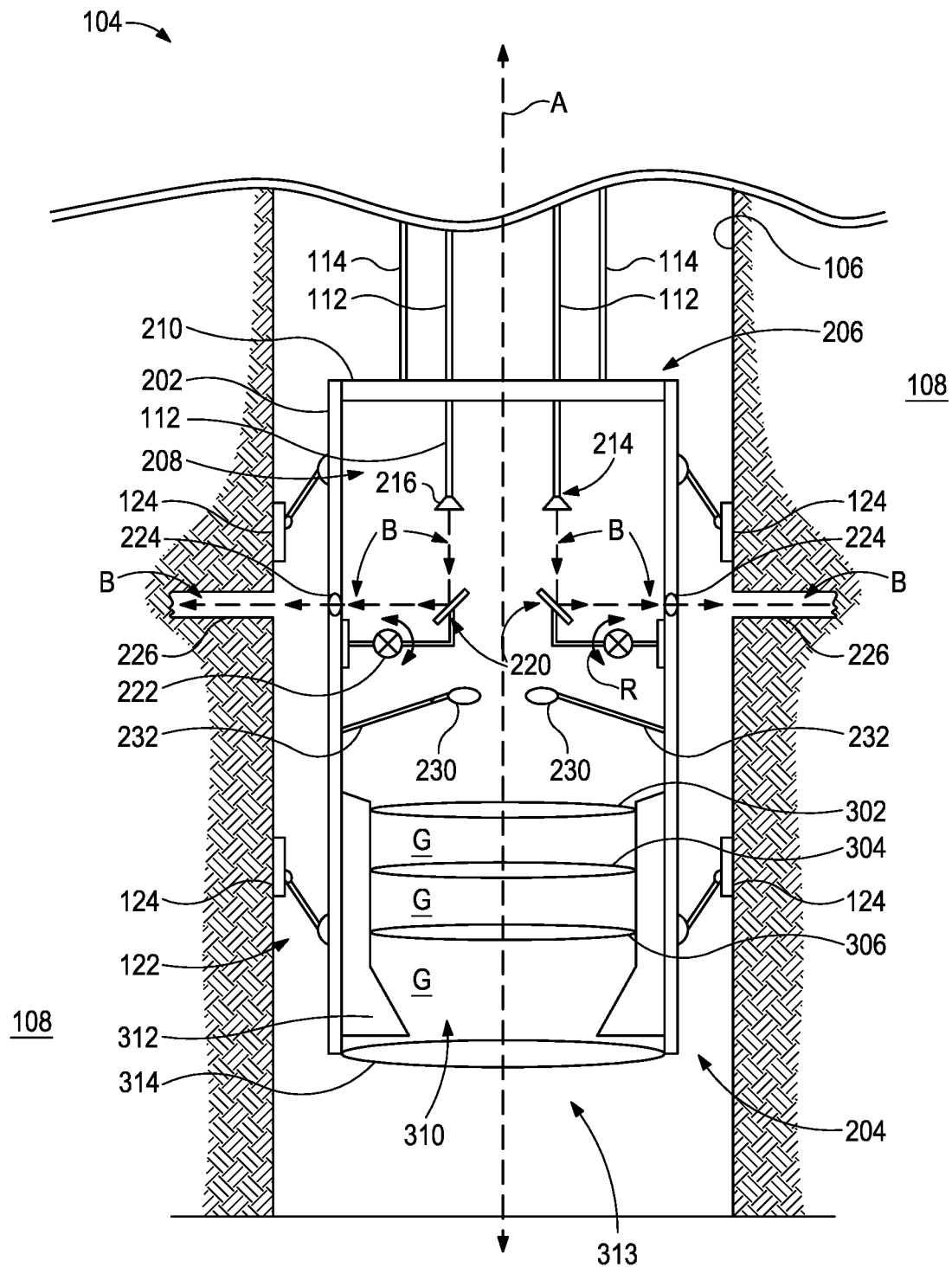
FIG. 2 is a cross section of a downhole assembly of the laser boring and perforating system of FIG. 1 when located downhole and when in the activated position, according to one or more embodiments of the present disclosure.
Figure 3:
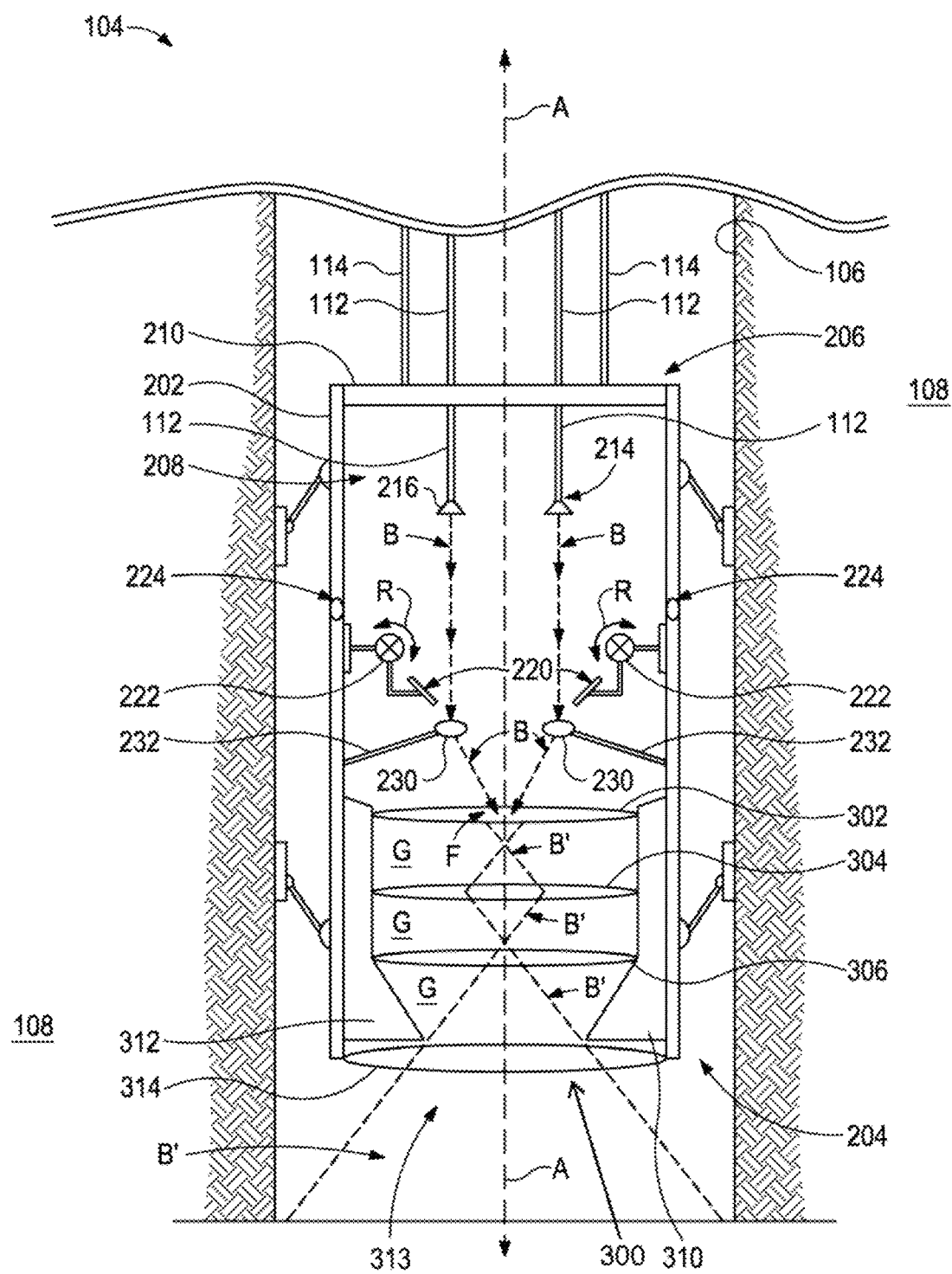
FIG. 3 is a cross section of the downhole assembly of FIG. 2 when in the deactivated position, according to one or more embodiments of the present disclosure.

FIGS. 2-3 illustrate a cross section of the assembly 104 of FIG. 1 when located downhole of the wellbore 106, according to one or more embodiments of the present disclosure. As shown, the assembly 104 includes a tool housing 202. The tool housing 202 extends along a tool axis A and includes a downhole end 204 and an uphole end 206. In addition, the tool housing 202 defines an interior space 208 that extends between the downhole end 204 and the uphole end 206. In the illustrated example, the tool housing 202 is cylindrical in shape, but the tool housing 202 may have other geometries in other embodiments.

As shown in FIG. 1, the plurality of optical pathways 112 extend to the tool housing 202 within the coiled tubing 114. Each optical pathway 112 is configured to direct an individual laser beam B generated by the laser generating source 102 (FIG. 1) into the interior space 208 of the tool housing 202. In embodiments, the optical pathways 112 extend through the tool housing 202 and into the interior space 208. In the illustrated embodiment, a base 210 is provided at the uphole end 206 of the tool housing 202 and the plurality of optical pathways 112 extend through the base 210.

Each optical pathway 112 includes an input end 212 (FIG. 1) and an output end 214. The input end 212 of the optical pathways 112 is connected to the laser generating source 102 such that each optical pathway 112 is in communication with the laser of the laser generating source 102 (FIG. 1) to receive and conduct/transmit the laser beams B. The laser beams B exit their respective optical pathway 112 at the output end 214. In the illustrated embodiment, a collimator 216 is provided at the output end 214 of each optical pathway 112. The collimators 216 may be mounted within the interior space 208 of the tool housing 202 and function to align the electromagnetic radiation emitted therefrom in a uniform column in the form of the laser beams B. Here, each of the collimators 216 is provided within the interior space 208 of the tool housing 202 and oriented such that it directs the laser beam B associated with it through the interior space 208 parallel to the tool axis A.

The assembly 104 further includes a plurality of reflectors 220, such as mirrors. In the illustrated embodiment, the reflectors 220 include a pair of reflectors (i.e., first and second reflectors); however, more or less than two reflectors may be utilized. Also in the illustrated embodiment, the pair of reflectors 220 are positioned proximate to each other and at the same position measured along tool axis A, such that the pair of reflectors 220 defines a single (or first) stage of reflectors. However, as described below, the assembly 103 may include one or more additional stages of reflectors positioned elsewhere along the tool axis A. Also in the illustrated embodiment, each reflector 220 is positioned at opposite sides of the tool housing 202 (e.g., angularly opposite), such that they are positioned about 180° apart from each other. However, the reflectors 220 may be provided elsewhere about the tool housing 202.

Each reflector 220 is associated with one of the collimators 216 and one of the optical pathways 112. In addition, each reflector 220 is able to be positioned in the path of the laser beam B discharged from the collimator 216 associated therewith, as shown in FIG. 2. As described herein, the reflectors 220 are each movable between an activated position, as shown in FIG. 2, and a deactivated position, as shown in FIG. 3. In the illustrated embodiment, the assembly 104 includes at least one motor 222 operable to transition one or more of the reflectors 220 between the activated and deactivated positions. In the illustrated embodiment, each reflector 220 is operatively coupled to a discrete motor 222 to move the corresponding reflector 220 as indicated by rotational arrow R. However, in other embodiments, more than one of the reflectors 220 may be operatively coupled to the same motor 222 such that they are movable in unison via an individual motor 222. In the illustrated embodiment, The motors 222 are mounted within the interior space 208 of the tool housing 202. The motors 222 may be in communication with the master controller 126 (FIG. 1) such that they may be controlled from the surface 110. Thus, the operator may utilize the master controller 126 to move the reflectors 220 between the activated and deactivated positions.

When in the activated position, the reflectors 220 are each angled or oriented such that they are operable to redirect or reflect the associated laser beam B radially outward and away from the tool axis A. In the illustrated embodiment, a plurality of side ports 224 are formed in the tool housing 202 and positioned such that each laser beam B may be directed out of the tool housing 202 through a corresponding one of the side ports 224. In embodiments, a lens or transparent cover may be provided in each side port 224, such that the interior space 208 of the tool housing 202 may remain sealed from the ambient environment while permitting the laser beams B to exit the tool housing 202. When the reflectors 220 are in the activated position and redirecting/reflecting the laser beams B radially outward from the tool housing 202, the laser beams B will penetrate the sides of the wellbore 106 to create perforations 226. In applications where the wellbore 106 is lined with casing or another type of wellbore liner, the laser beams B may also be operable to penetrate the casing. In the illustrated embodiment, the reflectors 220 redirect the laser beams B radially outward from the tool housing 202 generally parallel to each other and oriented in the same plane. However, the radially redirected laser beams B need not be in the same plane or parallel to each other.

The assembly 104 also includes a plurality reshaping lenses 230. Each reshaping lens 230 is arranged within the interior space 208 of the tool housing 202. During use, the laser beams B are transmitted along the tool axis A and, when the reflectors 220 are in the deactivated position, the laser beams B will each travel axially along the tool axis A further down the interior space 208 of the tool housing 202 (than when in the activated position), such that the laser beams B bypass the plurality of reflectors 220 and contact the reshaping lenses 230. As best seen in FIG. 3, the reshaping lenses 230 combine the individual laser beams B into a combined main laser beam B' that exits the downhole end 204 of the tool housing 202. Thus, when the plurality of reflectors 220 are in the deactivated position, the assembly 104 is operable direct the combined main laser beam B' axially down bore as described below.

In the illustrated embodiment, each reshaping lens 230 is supported within the interior space 208 via a support 232. The supports 232 may be holders made from various types of material, such as materials that resist heating up, such as copper. In embodiments, the supports 232 are attached via mechanical fasteners, such as bolts or screws. In addition, each reshaping lens 230 is associated with one of the reflectors 220, one of the collimators 216, and one of the optical pathways 112. Further, each reshaping lens 230 is positioned within the path of one of the laser beams B, so that the laser beam B will contact and interact with the reshaping lens 230 when the corresponding reflector 220 is in the deactivated position. For example, when the reflectors 220 are in the activated position, the laser beams B are redirected out of the tool housing 202, as described above with reference to FIG. 2. In contrast, when the reflectors 220 are in the deactivated position, as shown in FIG. 3, each laser beam B is directed to a corresponding one of the reshaping lenses 230. Thus, the reshaping lenses 230 are operable to redirect the laser beams B, for example, when the reflectors 220 are in the deactivated position. As shown, each reshaping lens 230 receives and redirects one of the laser beams B, and the reshaping lenses 230 are each configured to redirect its associated laser beam B radially inward toward the tool axis A and the downhole end 204, such that the laser beams B converge together at a focal point F.

Still referring to FIG. 3, the assembly 104 also includes a main beam optical assembly 300. The main beam optical assembly 300 is operable to receive the individual laser beams B received from the reshaping lenses 230, and combine the individual laser beams B into the main beam B'. The main beam optical assembly 300 may be provided at or near the downhole end 204 of the tool housing 202, and may be at least partially arranged within the interior space 208 of the tool housing 202.

In the illustrated embodiment, the uphole end of the main beam optical assembly 300 is positioned at the focal point F. As illustrated, the main beam optical assembly 300 includes a first focusing lens 302 positioned at the focal point F, a second focusing lens 304 positioned downhole of the first focusing lens 302, and a third focusing lens 306 positioned downhole of the second focusing lens 304. As shown, in the illustrated embodiment, the third focusing lens 306 is positioned closest to the downhole end 204 and the first focusing lens 302 is positioned closest to the uphole end 206, and the second focusing lens 304 interposes the first and third focusing lenses 302, 306. The focusing lenses 302, 304, 306 are operable to combine the individual laser beams B into the combined main laser beam B' which is more powerful than any of the individual laser beams B. In addition, the focusing lenses 302, 304, 306 are operable to manipulate the shape of the combined main laser beam B' into a desired shape and strength suitable for boring. Thus, the focusing lenses 302, 304, 306 are operable to merge the individual beams B and reshape them into the main laser beam B'.

Also in the illustrated embodiment, the main beam optical assembly 300 includes a nozzle 310 at the downhole end of the main beam optical assembly 300. During use, the combined main laser beam B' exits the main beam optical assembly 300 at the nozzle 310. The nozzle 310 includes baffles 312 configured to facilitate shaping of the combined main laser beam B'.

As mentioned above, the tool housing 202 includes an opening 313 at the downhole end 204 thereof. In the illustrated embodiment, the assembly 104 further includes a distal lens 314 arranged in the opening 313. The distal lens 314 is configured to permit the combined main laser beam B' to be transmitted through the distal lens 314, such that the combined main laser beam B' may be directed downhole from the assembly 104. In embodiments, the distal lens is a transparent cover and operable to inhibit particulate and substances present in the wellbore 106 from entering the interior space 208 of the tool housing 202 and/or the main beam optical assembly 300. In embodiments, the distal lens 314 is integral with the main beam optical assembly 300. For example, the distal lens 314 may be supported within the nozzle 310 thereof, for example, within the baffles 312.

During operation, significant heat generation may occur within the main beam optical assembly 300, the focusing lenses 302, 304, 306, and/or the distal lens 314 may be exposed to high temperatures due to their interaction with the combined main laser beam B'. To provide cooling and otherwise control heat generation, an inert gas G may be utilized to cool the optics of the main beam optical assembly 300. In an embodiment, the inert gas G is provided in a first space defined between the first focusing lens 302 and the second focusing lens 304, in a second space defined between the second focusing lens 304 and the third focusing lens 306, and/or in a third space defined between the third focusing lens 306 and the distal lens 314. In embodiments, the inert gas G includes Nitrogen; however, other gases may be utilized in addition to or in lieu of Nitrogen. In addition to cooling the optics, utilization of the inert gas G ensures the downhole path of the combined main laser beam B' within the assembly 104 is clearer than would otherwise be if traveling through ambient air.

The combined main laser beam B' exiting the assembly 104, which has more power and energy than the individual laser beams B, is directed axially downhole and can be used to perform a drilling or boring function within the wellbore 106. As will be appreciated, drilling or boring may be utilized to deepen the wellbore 106. As shown in FIG. 3, the main laser beam B' expands radially outward (relative to the tool axis A) as it travels axially downhole, such that it is operable to enlarge the wellbore 106 in order to permit the assembly 104 to travel there-through. However, when the reflectors 210 are in the activated position, as shown in FIG. 2, the individual laser beams B are directed radially outward to create the perforations 226. As mentioned above, the individual laser beams B are transmitted to the assembly 104 via each optical pathway 112, which are of relatively lower power than the main laser beam B'. However, less power loss occurs when transmitting relatively lower power through the optical pathways 112 as compared if relatively higher power were conveyed therethrough. Thus, the system 100 is more efficient than conventional systems that would convey relatively higher power to the downhole assembly via a single optical pathway. Moreover, the assembly 104 is still operable to generate the main laser beam B' by aggregating the individual laser beams B, which is of relatively higher power and suitable for operations in which higher power is desirable, such as laser drilling.

Figure 4:
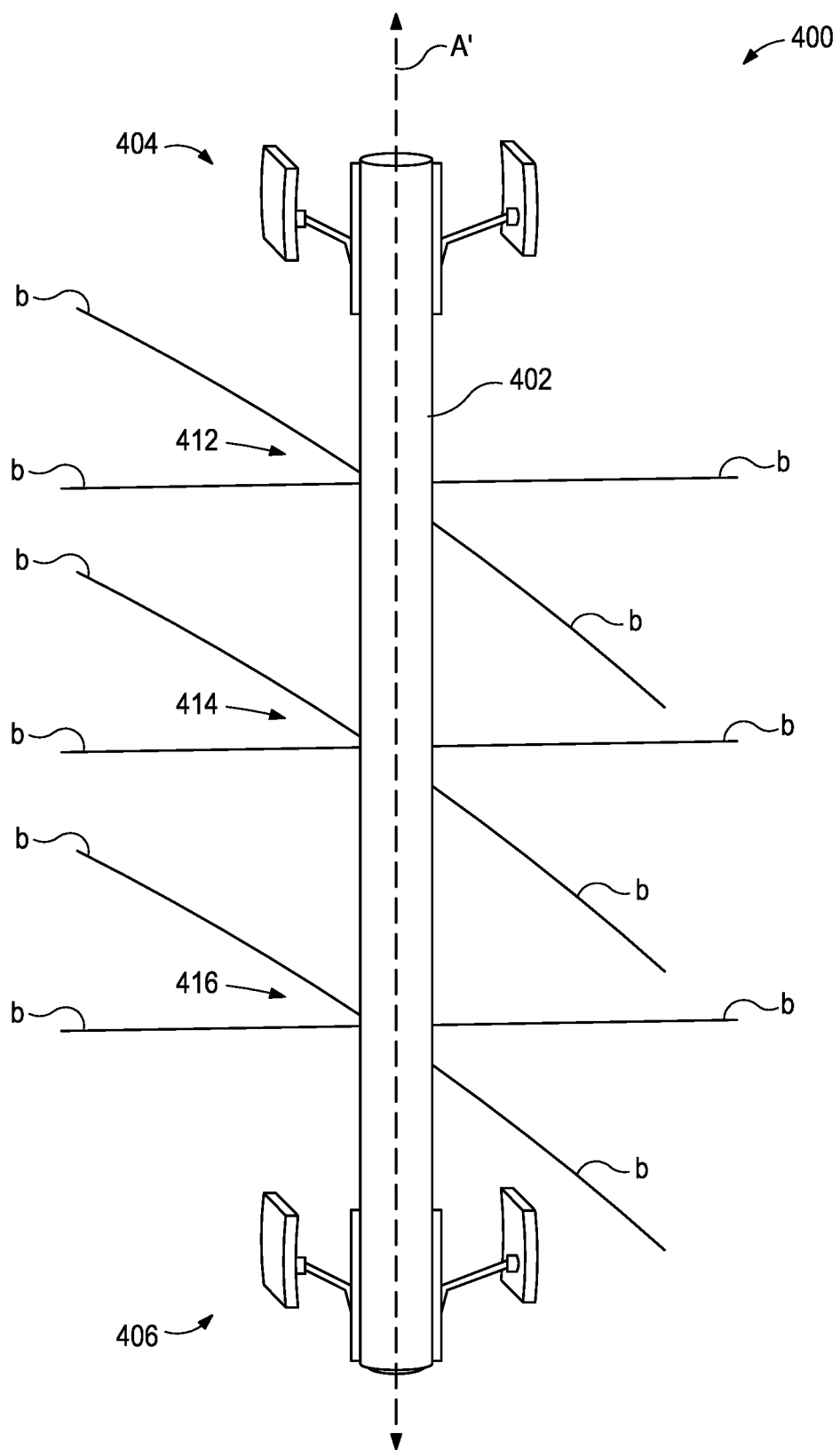
FIG. 4 is an embodiment of a downhole assembly incorporating more than one stage of reflectors, according to one or more embodiments of the present disclosure.

While FIGS. 2-3 illustrate an embodiment of the assembly 104 having a pair of reflectors 120 arranged as a single stage, one or more additional stages of reflectors may be provided. FIG. 4 illustrates another example downhole assembly 400 incorporating several stages of reflectors, according to one or more additional embodiments of the present disclosure. As with the assembly 104 described above, the downhole assembly 400 (hereinafter "the assembly 400") includes a tool housing 402 that extends along a tool axis A', and the tool housing 402 includes an uphole end 404 and a downhole end 406.

In the illustrated embodiment, the downhole assembly 400 (hereinafter, the assembly 400) includes a first stage 412, a second stage 414, and a third stage 416 (collectively, the stages 412, 414, 416). The first stage 412 is closest to the uphole end 404, the third stage 416 is closest to the downhole end 406, and the second stage 414 interposes the first and third stages 412, 416. While three stages 412, 414, 416 are included in the assembly 400, more or less than three stages may be included, without departing from the scope of the disclosure.

In the illustrated embodiment, each stage 412, 414, 416 is configured to discharge four separate laser beams b out of the tool housing 402, radially outward from the tool axis A'. Thus, in the illustrated embodiment, each stage 412, 414, 416 may include four reflectors that are operable to radially redirect electromagnetic (laser) energy as described above with reference to the plurality of reflectors 220 (FIGS. 2 and 3). In the illustrated embodiment, each reflector in the first stage 412 is positioned within the tool housing 402 at ninety-degree intervals, such that the laser beams b emitted from the first stage 412 are directed radially outward within a plane and at orientations that are perpendicular to neighboring laser beams b. The reflectors in the second and third stages 414, 416 are similarly positioned to direct their laser beams b in a similar manner; however, the reflectors in any one or more of the stages may be differently positioned to direct their laser beam b in a different orientation or direction.

In the illustrated embodiment, the assembly 400 is operable to activate the laser beams b of all of the stages 412, 414, 416 at the same time (simultaneously). As shown, FIG. 4 depicts an example where twelve laser beams b are being directed radially outward of the tool housing 402. Thus, in this embodiment, the assembly 400 would include twelve optical pathways (not shown) and associated collimators (i.e., a collimator on each of the twelve reflectors), each responsible for sending one laser beam b to the associated reflector, such that all twelve laser beams b may be simultaneously directed radially outward of the tool housing 402 as shown. The assembly 400 may further include at least one reshaping lens (e.g., twelve associated reshaping lenses, with each reshaping lens associated with one of the optical pathways) operable for redirecting the energy from each optical pathway into a combined main laser beam (not shown). Here, each individual reshaping lens may be aligned with one of the reflectors and one of the optical pathways. Similarly in this embodiment, the assembly 400 is operable to deactivate all of the laser beams b of all of the stages 412, 414, 416 at the same time, such that the energy from all twelve of the optical pathways may be directed axially toward the downhole end 406 of the tool housing 402, combined into a main laser beam via the reshaping lens(es), and then the main laser beam may be emitted out of the downhole end 406 of the tool housing 402, wherein the main laser beam exhibits a higher energy than any of the discrete laser beams b which are each of relatively lower power.

In other embodiments, however, the stages 412, 414, 416 may be separately activatable and separately deactivatable. In such embodiments, the assembly 400 could include four optical pathways (not shown) and associated collimators, each responsible for sending one of the laser beams b to one of the four reflectors of one of the stages 412, 414, 416, such that the four laser beams b may be directed radially outward of the tool housing 402, one stage at a time. In such embodiments, a first reflector in the first stage 412, a first reflector in the second stage 414, and a first reflector in the third stage 416 may all be in alignment with each other and with one of the four optical pathways, such that the first reflector in the first stage 412 may receive the energy beam, such that the first reflector in the second stage 414 may receive the energy beam when the first reflector in the first stage 412 is in the deactivated position, and such that the first reflector in the third stage 416 may receive the energy beam when the first reflector in the first stage 412 and the first reflector in the second stage 414 are in the deactivated positions.

Moreover, in such embodiments, the assembly 400 includes four reshaping lenses each in alignment with one of the four optical pathways such that, when the all of the reflectors are in the deactivated position, energy from the four optical pathways may be directed axially toward the downhole end 406 and then redirected the reshaping lenses and combined into a main laser beam that is emitted out of the downhole end 406 of the tool housing 402. For example, the reflectors in the first stage 412 may be activated to cause the laser beams b in that stage to be radially directed out of the tool housing 402, and then either or both of the second stage 414 and/or the third stage 416 may be selectively activated to thereby cause the laser beams b associated therewith to also be radially directed out of the tool housing 402; or, the stages 412, 414, 416 may all be simultaneously deactivated, and then the energy from the four optical pathways may be directed axially toward the downhole end 406 and then redirected by one or more reshaping lenses and combined into a main laser beam that is emitted out of the downhole end 406 of the tool housing 402, wherein the main laser beam exhibits a higher energy than any of the discrete laser beams b which are each of relatively lower power. In embodiments, less than all of the stages 412, 414, 416 may be activated to radially direct the laser beams b associated therewith out of the tool housing 402, while the remaining one or more stages 412, 414, 416 are deactivated such that energy associated with such deactivated reflectors may be directed axially toward the downhole end 406 and then redirected by one or more reshaping lenses and combined into a main laser beam that is emitted out of the downhole end 406 of the tool housing 402.

Figure 5:
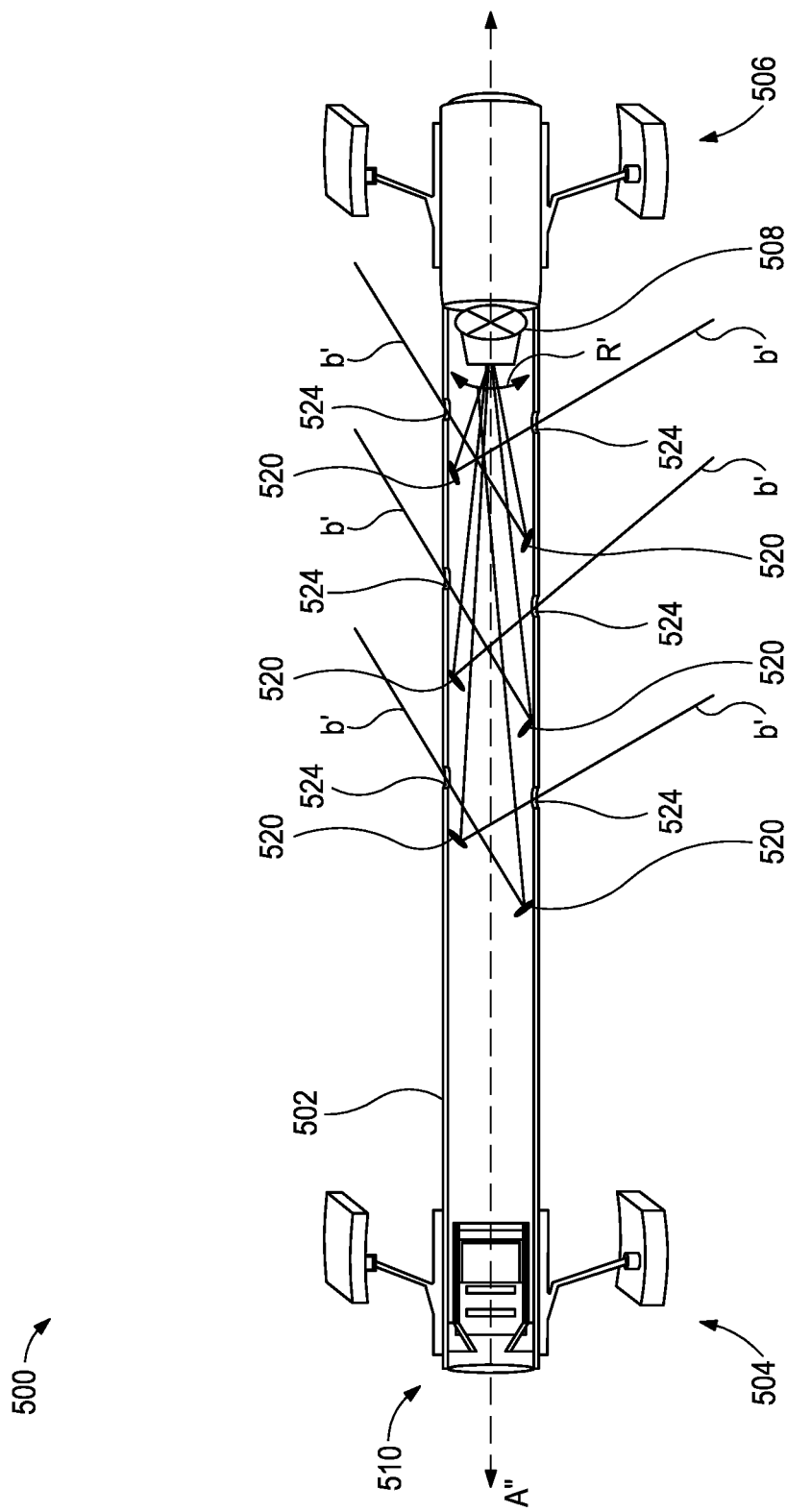
FIG. 5 is an embodiment of a downhole assembly, incorporating a plurality of reflectors and a rotational head that is operable to both emit one or more lasers beams and rotate.

FIG. 5 illustrates yet another example downhole assembly 500, according to one or more additional embodiments of the present disclosure. As with the assemblies 104 and 400 described above, the downhole assembly 500 (hereinafter "the assembly 500") includes a tool housing 502 that extends along a tool axis A", and the tool housing 502 includes a downhole end 504 and an uphole end 506. In the illustrated embodiment, the assembly 500 includes a rotational head 508 that is operable to both emit one or more lasers beams and rotate, as indicated by rotational arrow R', wherein rotation of the rotational head 508 affects direction and/or emission of the one or more laser beams. As shown, the rotational head 508 is arranged within the interior space of the tool housing 502 and is operatively connected to one or more the optical pathways, as described above. Also, as described with reference to the assembly 104, the assembly 500 includes a main beam optical assembly 510 that is operable to receive one or more laser beams received from the rotational head 508, and combine/direct it/them into a main beam B. The main beam optical assembly 510 may be provided at or near the downhole end 504 of the tool housing 502, and may be at least partially arranged within the interior space of the tool housing 502.

In addition, the assembly 500 includes a plurality of reflectors 520 arranged within the interior space of the tool housing 502. Also, the housing 502 includes a plurality of exit ports 524, with each of the exit ports 524 corresponding with one of the reflectors 520 such that a beam redirected by one of the reflectors 520 passes through an associated one of the exit ports 524.

In some embodiments, the rotational head 508 is connected to just one optical pathway (not shown) that delivers a single laser beam. In these embodiments, the rotational head 508 is rotatable between at least two positions, an activated position where the rotational head 508 splits the single laser beam into separate laser beams b', and a deactivated position where the rotational head 508 directs the single laser beam distally down through the interior space of the tool body 502 towards the main beam optical assembly 510, wherein the main beam optical assembly 510 is operable to receive the single laser (not shown), and focus it and then direct it axially out of the tool housing 502 distally along the tool axis A". In the illustrated embodiment, the rotational head 508 is depicted in the activated position, such that the single laser beam and the distally projected focused main beam is not shown. However, when in the illustrated activated position, the rotational head 508 splits the single laser beam into separate laser beams b' and directs each separate laser beam b' toward a respective one of the reflectors 520, wherein the reflectors 520, in turn, redirect their respective laser beam b' radially outward through the respective exit port 524 and into the formation, as detailed above.

In other embodiments, the rotational head 508 is connected to multiple optical pathways (not shown) that each deliver a single laser beam b'. In these embodiments, the rotational head 508 is rotatable between at least two positions, an activated position where the rotational head 508 directs each of the separate laser beams b' towards a respective one of the reflectors 520, and a deactivated position where the rotational head 508 directs each of the separate laser beams b' distally down through the interior space of the tool body 502 towards the main beam optical assembly 510, wherein the main beam optical assembly 510 is operable to receive each of the separate laser beams b' (not shown), and focus them and combine them into an axially directed main beam that may be projected distally out of the tool housing 502 along the tool axis A". In the illustrated embodiment, the rotational head 508 is depicted in the activated position, such that the distally projected combined main beam is not shown. However, when in the illustrated activated position, the rotational head 508 directs each laser beam b' toward a respective reflector 520, wherein the reflectors 520, in turn, each redirect their respective laser beam b' radially outward through the respective exit port 524 and into the formation, as detailed above.

The assembly 500 may include a motor (not shown) that is operably connected to the rotational head 508 and configured to rotate the rotational head 508 as indicated by the arrow R'. The motor may be arranged within the interior space of the tool housing 502, and may be communication with the master controller 126 (FIG. 1) such that it may be controlled from the surface 110. Thus, the operator may utilize the master controller 126 to move the rotational head 508 between the activated and deactivated positions.

In embodiments, the reflectors 520 may be fixed within the tool housing 502, such that they cannot be moved or adjusted. In other embodiments, the reflectors 520 are adjustable within the tool housing 502, such that the operator may move them to adjust their orientation and thereby adjust the manner in which they redirect the separate laser beams b' radially outward from the tool housing 502. In such examples, the operator may pre-set or pre-adjust the reflectors 520 into a desired orientation (before using the assembly 500 downhole (e.g., when the assembly 500 is at the surface 110), and then lower the assembly 500 downhole with the reflectors 520 having already been pre-adjusted in a desired orientation. In even other embodiments, the reflectors 520 may be motorized and adjustable when the assembly 500 is downhole, as described above with respect to the assemblies 104 and 400.

Embodiments disclosed herein include:

A. A system, comprising: a laser generating source; first and second optical pathways operatively connected to the laser generating source for receiving first and second energy beams, respectively; and a downhole assembly in communication with the laser generating source via the first and second optical pathways, the downhole assembly including: a tool housing extending along a tool axis and having opposing downhole and uphole ends, the first and second optical pathways being operable to direct the first and second energy beams to the tool housing, respectively; a first reflector and a second reflector each movable between an activated position and a deactivated position, the first and second reflectors being arranged to reflect the first and second energy beams, respectively, radially outward and away from the tool axis when in the activated position; a first reshaping lens and a second reshaping lens each arranged within the interior space, the first and second reshaping lenses being arranged to receive and redirect the first and second energy beams, respectively, when the first and second reflectors are in the deactivated position; and a main beam optical assembly operable to combine the first and second energy beams received from the first and second reshaping lenses into a combined energy beam that is directed along the tool axis when the first and second reflectors are in the deactivated position.

B. A system, comprising: a laser generating source; and a downhole assembly that includes: a tool housing extending along a tool axis and having opposing downhole and uphole ends, the tool housing defining an interior space that extends between the downhole and uphole ends; first and second optical pathways extending between the laser generating source and the tool housing, the first and second optical pathways each having an input end in optical communication with the laser generating source and an output end from which energy is discharged, the first and second optical pathways each configured to conduct energy between the input and output ends; first and second reflectors arranged within the interior space and each being movable between an activated position and a deactivated position, the first reflector being aligned with the output end of the first optical pathway to receive energy discharged therefrom when in the activated position, and the second reflector being aligned with the output end of the second optical pathway to receive energy discharged therefrom when in the activated position; first and second reshaping lenses arranged within the interior space, the first reshaping lens being aligned with the output end of the first optical pathway to receive energy discharged therefrom when the first reflector is in the deactivated position, and the second reshaping lens being aligned with the output end of the second optical pathway to receive energy discharged therefrom when the second reflector is in the deactivated position; and a main beam optical assembly at least partially arranged in the interior space and operable to combine energy received from the first and second reshaping lenses, wherein, when in the activated positions, the first and second reflectors redirect energy received from the output ends of the first and second optical pathways, respectfully, radially outward and away from the tool axis, and wherein, when the first and second reflectors are in the deactivated position, the main beam optical assembly combines energy received from the first and second reshaping lenses, and directs combined energy axially along the tool axis.

C. A method comprising: conveying a downhole assembly into a wellbore on coiled tubing, the coiled tubing having first and second optical pathways extending therein between the downhole assembly and a laser generating source, the downhole assembly having a tool housing that extends along a tool axis; transmitting first and second energy beams to the downhole assembly via the first and second optical pathways, respectively; arranging first and second reflectors within the downhole assembly in an activated position and thereby reflecting the first and second energy beams radially outward and away from the tool axis; arranging the first and second reflectors within the downhole assembly in a deactivated position and thereby conveying the first and second energy beams to first and second reshaping lenses, respectively; and with a main beam optical assembly included in the downhole assembly, combining the first and second energy beams received from the first and second reshaping lenses into a combined energy beam; and directing the combined energy beam out of the tool housing along the tool axis.

Each of embodiments A through C may have one or more of the following additional elements in any combination: Element 1: wherein the tool housing includes a first side port associated with the first reflector and a second side port associated with the second reflector, the first reflector being operable to redirect the first energy beam through the first side port when in the activated position, and the second reflector being operable to redirect the second energy beam through the second side port when in the activated position. Element 2: further comprising a transparent cover arranged within each of the first and second side ports. Element 3: further comprising a third reflector and a fourth reflector each movable between an activated position and a deactivated position, wherein the third reflector is arranged to reflect the first energy beam radially outward and away from the tool axis when in the activated position and when the first reflector is in the deactivated position, and the fourth reflector is arranged to reflect the second energy beam radially outward away from the tool axis when in the activated position and when the second reflector is in the deactivated position. Element 4: wherein, when the first, second, third, and fourth reflectors are all in the deactivated position, the first and second energy beams travel past the first, second, third, and fourth reflectors and are combined into the combined beam. Element 5: wherein the third and fourth reflectors are positioned closer to the downhole end than the first and second reflectors, the third reflector being aligned with the first optical pathway and the first reflector, and the fourth reflector being aligned with the second optical pathway and the second reflector. Element 6: wherein the first reshaping lens is aligned with the first optical pathway, the first reflector, and the third reflector, and the second reshaping lens is aligned with the second optical pathway, the second reflector, and the fourth reflector. Element 7: further comprising: third and fourth optical pathways operatively connected to the laser generating source for receiving third and fourth energy beams, respectively, the third and fourth optical pathways each extending between the laser generating source and the tool housing and being operable to direct the third and fourth energy beams, respectively, to the tool housing, the downhole assembly further including: third and fourth reflectors each movable between an activated position and a deactivated position, the third and fourth reflectors being arranged to reflect the third and fourth energy beams radially outward and away from the tool axis when in the activated position. Element 8: wherein the downhole assembly further includes third and fourth reshaping lenses each arranged within the interior space, the third and fourth reshaping lenses being arranged to receive and redirect the third and fourth energy beams, respectively, to the main beam optical assembly when the third and fourth reflectors are in the deactivated position. Element 9: wherein, when the first, second, third, and fourth reflectors are all simultaneously in the deactivated position, the main beam optical assembly is operable to combine the first, second, third, and fourth energy beams into the combined energy beam. Element 10: wherein the first, second, third, and fourth reflectors are operable to simultaneously redirect the first, second, third, and fourth energy beams, respectively, when in the activated positions. Element 11: wherein the third and fourth reflectors are positioned closer to the downhole end than the first and second reflectors. Element 12: wherein the first and second optical pathways each comprise an input end in optical communication with the laser generating source and an output end, the downhole assembly further including: a first collimator provided at the output end of the first optical pathway and a second collimator provided at the output end of the second optical pathway. Element 13: wherein the downhole assembly further includes a centering assembly operable to center the tool housing within a wellbore. Element 14: wherein an inert gas is provided within the main beam optical assembly. Element 15: wherein the tool housing defines an opening at the downhole end, and the main beam optical assembly further includes a distal lens provided in the opening. Element 16: wherein the downhole assembly further includes at least one motor operable to move the first and second reflectors between the activated and deactivated positions. Element 17: wherein the first and second optical pathways are arranged within coiled tubing connected to the downhole assembly, the system further comprising: a rotatable spool around which the coiled tubing may be provided, and a drive assembly operable to control winding or unwinding of the coiled tubing about the rotatable spool.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:
    a laser generating source;
    first and second optical pathways operatively connected to the laser generating source for receiving first and second energy beams, respectively; and
    a downhole assembly in communication with the laser generating source via the first and second optical pathways, the downhole assembly including:
    a tool housing extending along a tool axis and having opposing downhole and uphole ends and defining an interior space extending between the downhole and uphole ends, the first and second optical pathways being operable to direct the first and second energy beams to the tool housing, respectively;
    a first reflector and a second reflector each movable between an activated position and a deactivated position, the first and second reflectors being arranged to reflect the first and second energy beams, respectively, radially outward and away from the tool axis when in the activated position;

a first reshaping lens and a second reshaping lens each arranged within the interior space, the first and second reshaping lenses being arranged to receive and redirect the first and second energy beams, respectively, when the first and second reflectors are in the deactivated position; and a main beam optical assembly operable to combine the first and second energy beams received from the first and second reshaping lenses into a combined energy beam that is directed along the tool axis when the first and second reflectors are in the deactivated position.

2. The system of claim 1, wherein the tool housing includes a first side port associated with the first reflector and a second side port associated with the second reflector, the first reflector being operable to redirect the first energy beam through the first side port when in the activated position, and the second reflector being operable to redirect the second energy beam through the second side port when in the activated position.

3. The system of claim 2, further comprising a transparent cover arranged within each of the first and second side ports.

4. The system of claim 1, further comprising a third reflector and a fourth reflector each movable between an activated position and a deactivated position, wherein the third reflector is arranged to reflect the first energy beam radially outward and away from the tool axis when in the activated position and when the first reflector is in the deactivated position, and the fourth reflector is arranged to reflect the second energy beam radially outward away from the tool axis when in the activated position and when the second reflector is in the deactivated position.

5. The system of claim 4, wherein, when the first, second, third, and fourth reflectors are all in the deactivated position, the first and second energy beams travel past the first, second, third, and fourth reflectors and are combined into the combined beam.

6. The system of claim 4, wherein the third and fourth reflectors are positioned closer to the downhole end than the first and second reflectors, the third reflector being aligned with the first optical pathway and the first reflector, and the fourth reflector being aligned with the second optical pathway and the second reflector.

7. The system of claim 6, wherein the first reshaping lens is aligned with the first optical pathway, the first reflector, and the third reflector, and the second reshaping lens is aligned with the second optical pathway, the second reflector, and the fourth reflector.

8. The system of claim 1, further comprising:

third and fourth optical pathways operatively connected to the laser generating source for receiving third and fourth energy beams, respectively, the third and fourth optical pathways each extending between the laser generating source and the tool housing and being operable to direct the third and fourth energy beams, respectively, to the tool housing, the downhole assembly further including:

third and fourth reflectors each movable between an activated position and a deactivated position, the third and fourth reflectors being arranged to reflect the third and fourth energy beams radially outward and away from the tool axis when in the activated position.

9. The system of claim 8, wherein the downhole assembly further includes third and fourth reshaping lenses each arranged within the interior space, the third and fourth reshaping lenses being arranged to receive and redirect the third and fourth energy beams, respectively, to the main beam optical assembly when the third and fourth reflectors are in the deactivated position.

10. The system of claim 9, wherein, when the first, second, third, and fourth reflectors are all simultaneously in the deactivated position, the main beam optical assembly is operable to combine the first, second, third, and fourth energy beams into the combined energy beam.

11. The system of claim 8, wherein the first, second, third, and fourth reflectors are operable to simultaneously redirect the first, second, third, and fourth energy beams, respectively, when in the activated positions.

12. The system of claim 8, wherein the third and fourth reflectors are positioned closer to the downhole end than the first and second reflectors.

13. The system of claim 1, wherein the first and second optical pathways each comprise an input end in optical communication with the laser generating source and an output end, the downhole assembly further including:

a first collimator provided at the output end of the first optical pathway and a second collimator provided at the output end of the second optical pathway.

14. The system of claim 1, wherein the downhole assembly further includes a centering assembly operable to center the tool housing within a wellbore.

15. The system of claim 1, wherein an inert gas is provided within the main beam optical assembly.

16. The system of claim 1, wherein the tool housing defines an opening at the downhole end, and the main beam optical assembly further includes a distal lens provided in the opening.

17. The system of claim 1, wherein the downhole assembly further includes at least one motor operable to move the first and second reflectors between the activated and deactivated positions.

18. The system of claim 1, wherein the first and second optical pathways are arranged within coiled tubing connected to the downhole assembly, the system further comprising:

a rotatable spool around which the coiled tubing may be provided, and a drive assembly operable to control winding or unwinding of the coiled tubing about the rotatable spool.

19. A system, comprising:

a laser generating source; and a downhole assembly that includes:

a tool housing extending along a tool axis and having opposing downhole and uphole ends, the tool housing defining an interior space that extends between the downhole and uphole ends;

first and second optical pathways extending between the laser generating source and the tool housing, the first and second optical pathways each having an input end in optical communication with the laser generating source and an output end from which energy is discharged, the first and second optical pathways each configured to conduct energy between the input and output ends;

first and second reflectors arranged within the interior space and each being movable between an activated position and a deactivated position, the first reflector being aligned with the output end of the first optical pathway to receive energy discharged therefrom when in the activated position, and the second reflector being aligned with the output end of the second optical pathway to receive energy discharged therefrom when in the activated position;

first and second reshaping lenses arranged within the interior space, the first reshaping lens being aligned with the output end of the first optical pathway to receive energy discharged therefrom when the first reflector is in the deactivated position, and the second reshaping lens being aligned with the output end of the second optical pathway to receive energy discharged therefrom when the second reflector is in the deactivated position; and a main beam optical assembly at least partially arranged in the interior space and operable to combine energy received from the first and second reshaping lenses, wherein, when in the activated positions, the first and second reflectors redirect energy received from the output ends of the first and second optical pathways, respectfully, radially outward and away from the tool axis, and wherein, when the first and second reflectors are in the deactivated position, the main beam optical assembly combines energy received from the first and second reshaping lenses, and directs combined energy axially along the tool axis.

20. A method, comprising:

conveying a downhole assembly into a wellbore on coiled tubing, the coiled tubing having first and second optical pathways extending therein between the downhole assembly and a laser generating source, the downhole assembly having a tool housing that extends along a tool axis;

transmitting first and second energy beams to the downhole assembly via the first and second optical pathways, respectively;

arranging first and second reflectors within the downhole assembly in an activated position and thereby reflecting the first and second energy beams radially outward and away from the tool axis;

arranging the first and second reflectors within the downhole assembly in a deactivated position and thereby conveying the first and second energy beams to first and second reshaping lenses, respectively; and with a main beam optical assembly included in the downhole assembly, combining the first and second energy beams received from the first and second reshaping lenses into a combined energy beam; and directing the combined energy beam out of the tool housing along the tool axis.

\* \* \* \* \*